Jan. 18, 1966   J. H. QUILLINAN   3,229,936
FORMING A SHIELD ON A RE-ENTRY BODY IN SPACE
Filed June 28, 1961   2 Sheets-Sheet 1
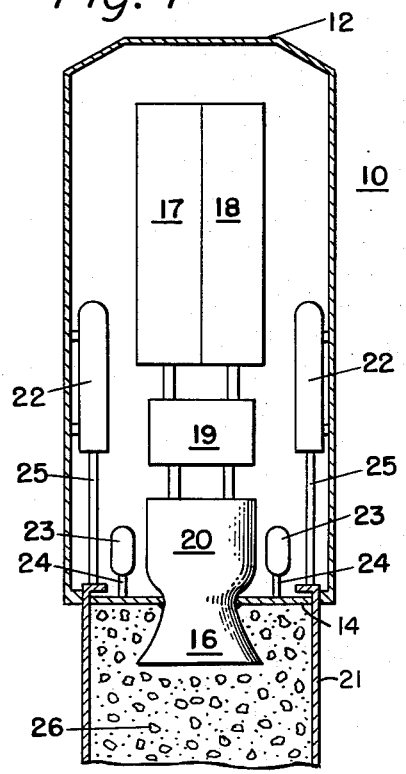
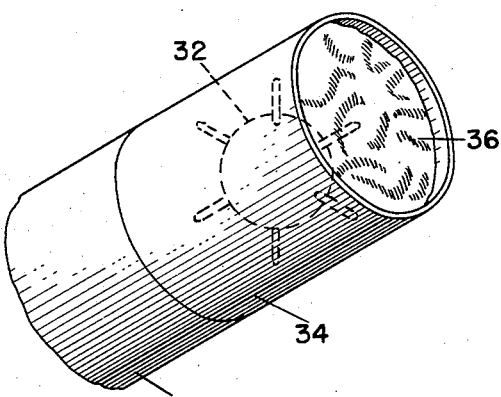
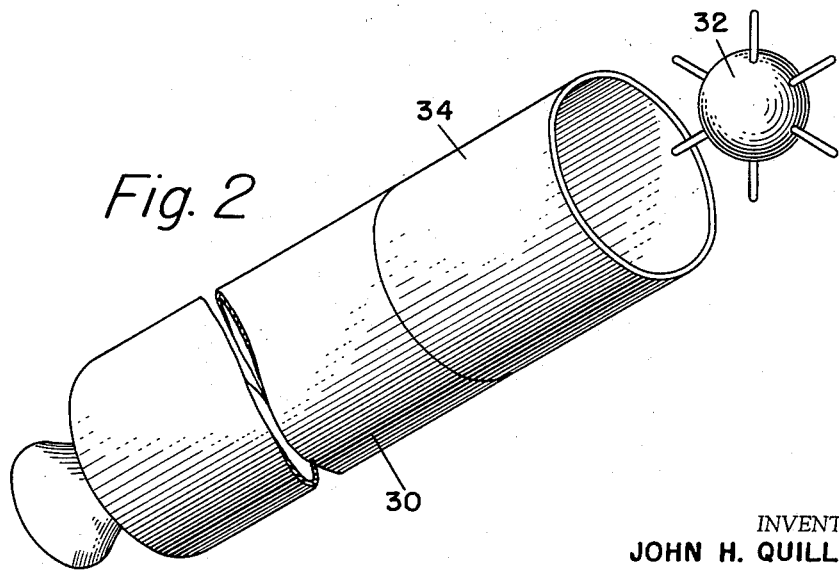
INVENTOR.
JOHN H. QUILLINAN
BY
ATTORNEY Jan. 18, 1966 J. H. QUILLINAN 3,229,936
FORMING A SHIELD ON A RE-ENTRY BODY IN SPACE
Filed June 28, 1961 2 Sheets-Sheet 2
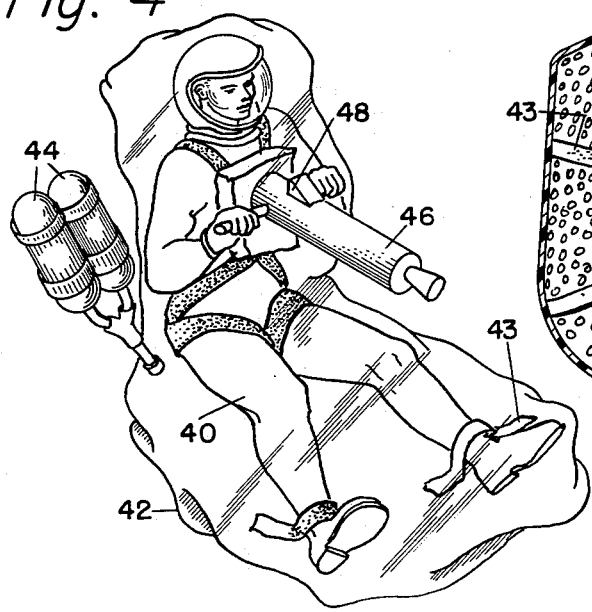
Fig. 4
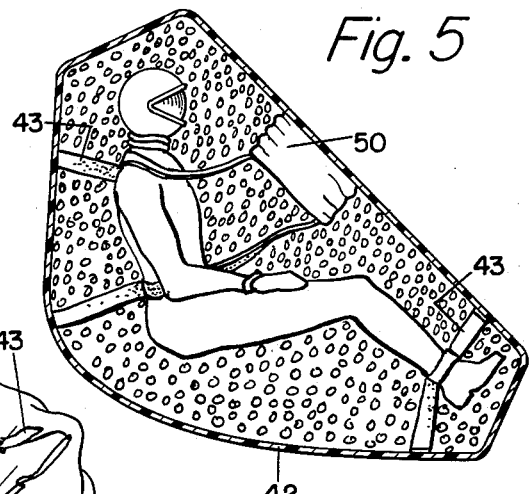
Fig. 5
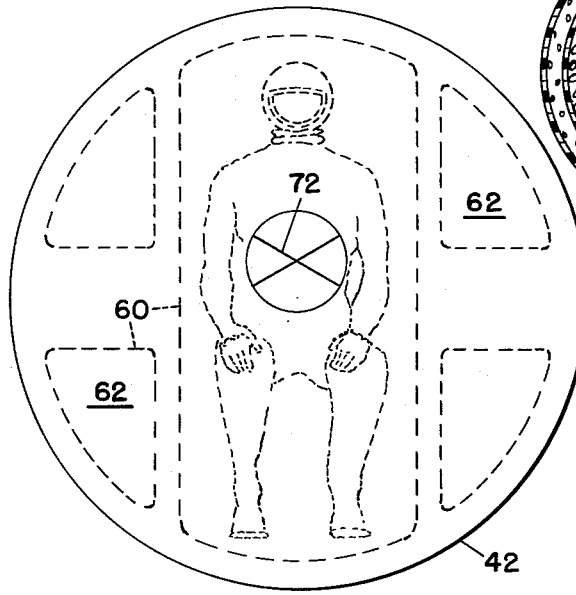
Fig. 6
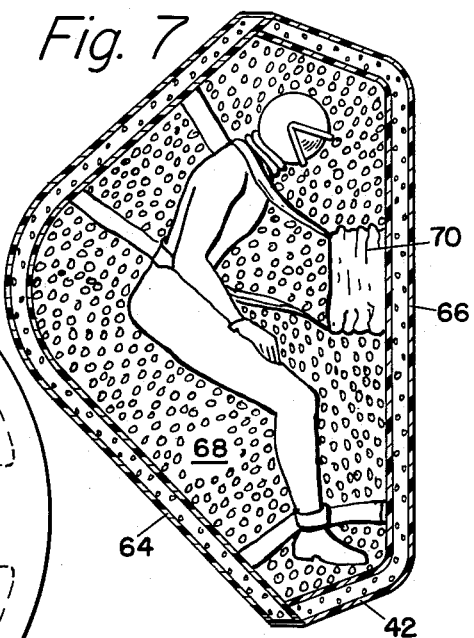
Fig. 7
INVENTOR.
JOHN H. QUILLINAN
BY 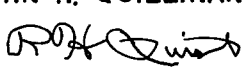
ATTORNEY

United States Patent Office 3,229,936
Patented Jan. 18, 1966

3,229,936
FORMING A SHIELD ON A RE-ENTRY
BODY IN SPACE
John Henry Quillinan, Ambler, Pa., assignor to General
Electric Company, a corporation of New York
Filed June 28, 1961, Ser. No. 120,375
1 Claim. (Cl. 244—138)

This invention relates generally to apparatus for forming a protective shield on an object and more particularly to the formation of such a shield from a foamed plastic in a substantially zero pressure environment.

The re-entry of an object from space to the atmosphere of the earth is accompanied by the generation of heat fluxes of such magnitude that the object will be destroyed or seriously damaged unless some protection is provided. One protective device is a shield of an ablative material which is normally applied to the surface of the object during its construction. This ablative shield rather than the object is therefore exposed to the effects of heat and is eroded away or ablated as the object enters the atmosphere.

For many purposes, however, it has not been possible to apply an ablative shield initially since the object functions properly only when its surface is devoid of extraneous material. Some other means of protection must be utilized therefore, in order to return objects of value, such as satellites, booster rockets, and, at times, men, from a space environment to earth.

It is therefore an object of this invention to provide apparatus for forming a protective shield on the surface of an object situated in a substantially zero pressure environment such as is found in space.

It is a further object of this invention to provide apparatus for forming a protective shield on a man situated in a substantially zero pressure environment.

Briefly stated, in carrying out the invention in one form, which may be preferred, a protective shield for the object or man is formed in space from a foamable plastic material. This plastic material is stored and transported in its unfoamed or high density condition and is foamed or changed into a low density state when it is desired to form the protective shield. Although for many purposes it is desirable to completely enclose the object or man with this protective shield, in some cases it may be sufficient to shield only a specific surface, such as the nozzle end of a booster rocket. To restrict or constrain the foam shield to a specific area or surface it may be desirable to provide a containing means such as a wall, which may be erected in space, and which will define the periphery of this surface. The foamable plastic is applied to the surface by means which will permit foaming to occur on the surface when desired.

In the case of a man, an inner suit, such as a space suit, may form the surface to which the foam is applied. A flexible envelope to enclose the man may be donned in space by the man, or initially enclose him. Additional apparatus, such as markers to aid in the location of the foamed-in object or man and retro rockets to de-orbit the man or object may be provided.

The protective shield formed in this manner will not only provide protection against heat fluxes, but may also absorb some of the shock occurring upon impact with the earth.

The invention will be better understood from the following description taken in connection with the accompanying drawings, in which:

FIGURE 1 is a schematic elevation, in cross-section, of a liquid fueled booster rocket in accordance with one embodiment of the invention;

FIGURE 2 is a schematic perspective of an interceptor rocket and satellite in accordance with a second embodiment of the invention;

FIGURE 3 is a schematic perspective of a portion of FIGURE 2 with the satellite secured in the interceptor rocket;

FIGURE 4 is a schematic perspective of a man beginning to employ emergency apparatus constructed in accordance with the invention;

FIGURE 5 is a schematic elevation in cross-section of the man of FIGURE 4 within the protective shield formed in accordance with the invention:

FIGURE 6 is a schematic elevation in cross-section of an alternative form of emergency apparatus constructed in accordance with the invention; and FIGURE 7 is a side view of the apparatus of FIGURE 6.

Referring now to FIGURE 1, a liquid fueled booster rocket 10 is represented having a nose 12 and a tail 14 incorporating a rocket nozzle 16. A fuel tank 17 and oxidizer tank 18 are normally positioned toward the nose 12 of the rocket, while the pumping device 19, for the fuel and oxidizer, is positioned toward the rear near the combustion chamber 20. The center of gravity of such a booster when the fuel and oxidizer have been consumed is located generally in the vicinity of pumping device 19, causing the booster to descend toward earth tail first when it has been detached from any other stages of a rocket system.

In accordance with the invention, a containing means such as cylindrical wall 21 is attached to booster 10 so as to surround tail 14 of the booster when extended as shown. Wall 21 may be extended to this position from a position adjoining the walls of booster 10 when the booster has stopped firing by suitable positioning apparatus such as a number of hydraulic cylinders 22 which contain pistons connected to piston rods 25.

A plurality of containers 23 are provided having nozzles 24 directed into the space 26 defined by the wall 21 and the tail 14 of the booster. Containers 23 hold the components of a foamable plastic, i.e., a plastic which will have a low density, cellular structure when the components are mixed and/or the proper conditions of temperature and pressure are provided. Suitable foamable plastic formulations will be hereafter described. Control means (not shown) are provided to release the foamable plastic from containers 23 through nozzles 24 when desired, so that the foaming of the plastic will occur within the space 26.

Proper selection of the formulation for the foamable plastic enables it to be contained within space 26 in spite of the lack of an end wall opposite the tail 14 of the booster. This result will be attained when the foam cures sufficiently rapidly so that a sufficiently high viscosity is achieved. The cured foam within space 26 forms a protective shield on the tail 14 of booster 10 which will be exposed to the heat fluxes experienced upon re-entry of the booster. The protective shield may also provide a cushioning or shock absorbing surface and so decrease damage to booster 10 when it finally lands.

Referring now to FIGURE 2, an interceptor rocket 30 is shown. An interceptor rocket is one designed to be launched from earth and be directed to an object in space such as satellite 32. Although some interceptor rockets are designed to destroy a target in space, rocket 30 is designed to snare satellite 32 and return it safely to earth.

Mounted on the nose of rocket 30 is a snaring device 34 having a capacity sufficient to enclose satellite 32. Snaring device 34 may be a cylinder having an open end as shown or some other device which will enable the satellite to be held near the nose of interceptor rocket 30. In a manner similar to that described in connection with FIGURE 1, a supply of foamable plastic is carried by interceptor rocket 30 in one or more containers, not shown, so that the foaming plastic may be released into snaring device 34 when desired.

Guidance devices associated with interceptor rocket 30 maneuver this rocket until satellite 32 is positioned within snaring device 34. In accordance with the invention foam is released about satellite 32 until the satellite is completely enclosed as is shown in FIGURE 3. A protective shield 36 of cured foam is therefore provided about satellite 32.

Conventional guidance devices then direct interceptor rocket 30 and its satellite cargo back to earth with the satellite adequately protected during re-entry and landing.

As was previously indicated, when a manned satellite becomes disabled it is desirable to provide emergency apparatus to return the crew safely to earth. Referring now to FIGURE 4, a man 40 is shown who has abandoned a disabled satellite and is in space. In accordance with the invention, a plastic envelope 42, which may be a polyethylene film, encloses the man 40 and his space suit. Envelope 42 may be donned by man 40 when the satellite becomes disabled or be worn continuously and is so constructed that when inflated it will have a predetermined size and shape. Before inflation envelope 42 is flexible enough to permit man 40 to perform necessary tasks. Ties 43 may be provided to properly position man 40 within envelope 42 when the envelope is inflated. A supply of foamable plastic is provided within containers 44 which may be released into envelope 42 when desired. Containers 44 may be positioned outside of plastic envelope 42 so that they may be detached when they are no longer needed.

A small retro rocket 46, also outside plastic envelope 42, is provided to enable man 40 to direct himself into a re-entry path. Retro rocket 46 incorporates an optical sight 48 which will provide man 40 with a sufficiently accurate alignment to fire the rocket in a direction to cause him to de-orbit. Retro rocket 46 is then discarded by man 40. A retro rocket may not be required if some other means is provided to retrieve the man from his position in space.

At this time, man 40 initiates the introduction of foam into plastic envelope 42. Due to the predetermined configuration which has been achieved by the inflation of envelope 42, the foam introduced into this envelope will form about its occupant so as to completely enclose him as shown in FIGURE 5. Ties 43 are more clearly shown in this figure as well as parachute 50 which may be designed to be released at a predetermined altitude.

The envelope 42 used to enclose man 40 may also be constructed as shown in FIGURE 6 so as to have a plurality of walls 60. With this construction it is possible to leave certain cavities 62 in the protective shield thereby reducing somewhat the quantity of foamable plastic required. In addition this structure facilitates the production of foamed plastics of different densities in different portions of the shield as is more clearly shown in FIGURE 7. For example, a fairly high density foam, e.g., 15 pounds per cubic foot, may be desired for ablation shield 64 which is provided on the side of the envelope 42 which will form the leading edge of the protective shield. The trailing edge 66 of the shield may be a less dense foam, e.g., 3 pounds per cubic foot, so as to provide sufficient structural strength while at the same time making it possible for a man contained within the foam to break out. Finally, a very low density foam 68, e.g., 1 pound per cubic foot may be provided to surround the man within envelope 42 thereby providing a soft cushion for a landing on earth.

A parachute 70 which can be released at the desired altitude is also contained within envelope 42. Parachute 70 can be released through the trailing edge foam shield 66 by incorporating cutting cords 72 as shown in FIGURE 6. Cutting cords 72 will facilitate the breaking of the trailing edge foam shield about the parachute containing region.

Additional signaling devices such as dye markers, radios, etc., may be provided to simplify finding man 40 when he has landed. Man 40 can break his way out the trailing edge 66 of the shield if desired, but he can also remain inside. The latter choice would be made if the landing was at sea.

As is well known in the art, thousands of foamable plastics have been developed, and, in fact, by merely varying the proportions of the ingredients used, a foam of different characteristics can be achieved. No attempt will be made here to indicate all foam formulations which would be suitable and all those which cannot be utilized; however, in accordance with the requirements of Section 112 of Title 35 of the U.S. Code specific formulations will be given which may be used when the environment in which the foam is produced is approximately 75° F. and ½ mm. of mercury, absolute, conditions which can be satisfied in a space environment.

In order to achieve a foam which will have a density of approximately 1 pound per cubic foot, the following ingredients in the given proportions, by weight may be mixed: a prepolymer, such as Nacconate 1080–HM, produced by the National Aniline Company, 108 parts; a surfactant, crosslinker, such as Witco 77–86, produced by the Witco Chemical Company, 1 part; a polyester, such as Plaskon PFR–6, produced by Allied Chemical Corporation, 100 parts; liquid benzyldimethylamine, 1 part; and a water loaded molecular sieve, such as CW–X143 (20% active by weight), produced by the Linde Company, 10 parts.

In order to achieve a foam which will have a density of approximately 3 pounds per cubic foot, the foregoing ingredients and proportions are mixed except that only 5 parts of the water-loaded molecular sieve are utilized. This reduction of water decreases the quantity of gas generated and thereby increases the density of the resultant foam.

Foaming of the plastic will be delayed until desired with these formulations if the water-loaded molecular sieve is stored apart from the remaining ingredients.

A relatively high density foam of 15 to 20 pounds per cubic foot may be produced by mixing the foregoing formulation in the stated proportions, and substituting for the water-loaded molecular sieve, 125 parts of a phenolic resin, such as 34,080 phenolic resin, produced by Monsanto Chemical Company.

No water has been included in this formulation in order to reduce the gas generation. The ingredients can be stored by keeping the polyester and the benzyldimethylamine apart from the remaining ingredients.

While particular embodiments of apparatus suitable for forming a shield on an object have been shown and described, it will be obvious that changes and modifications can be made without departing from the spirit of the invention and the scope of the appended claim.

I claim:

Emergency apparatus for the return of the crew of a manned satellite to earth comprising,
　a collapsed envelope of substantially inelastic material enclosing each man,
　said envelope having a plurality of cavities therein and being of a predetermined size and shape when inflated,
　a supply of a plurality of plastic materials having an initial high density state, and
　means for changing said plastic materials to final low density states in selected cavities of said envelope whereby a protective shield of plastic of different densities will be formed about each man conforming with the predetermined size and shape of said envelope.

(References on following page)

References Cited by the Examiner

UNITED STATES PATENTS

| | | | |
|---|---|---|---|
| Re. 24,767 | 1/1960 | Simon et al. | 206—46 |
| 2,806,667 | 9/1957 | Kugler | 244—138 X |
| 2,895,603 | 7/1959 | Freeman | 206—46 |
| 2,985,287 | 5/1961 | Schulz | 206—46 |
| 3,009,566 | 11/1961 | Oakley | 206—46 |
| 3,032,302 | 5/1962 | Clark | 244—138 |
| 3,090,580 | 5/1963 | Kehlet et al. | 244—1 |

FERGUS S. MIDDLETON, *Primary Examiner.*

THOMAS J. HICKEY, DAVID J. WILLIAMOWSKY,
*Examiners.*

F. R. HANDREN, R. J. SCANLAN, G. P. EDGELL,
*Assistant Examiners.*